COMPUTER CONTROLLED MULTI-ORDER PARALLEL PRINTER

Filed April 7, 1967 4 Sheets-Sheet 1

INVENTORS:
Joachim Hilgendorf et al
by Michael S. Striker,
Attorney

COMPUTER CONTROLLED MULTI-ORDER PARALLEL PRINTER

INVENTORS:
Joachim Hilgendorf et al
by Michael S. Striker,
Attorney

COMPUTER CONTROLLED MULTI-ORDER PARALLEL PRINTER

Filed April 7, 1967 4 Sheets-Sheet 3

INVENTORS:
Joachim Hilgendorf etal
by Michael S. Striker,
Attorney

COMPUTER CONTROLLED MULTI-ORDER PARALLEL PRINTER

Filed April 7, 1967 4 Sheets-Sheet 4

INVENTORS:
Joachim Hilgendorf et al
by Michael S. Striker,
Attorney

3,384,009 COMPUTER CONTROLLED MULTI-ORDER PARALLEL PRINTER

Joachim Hilgendorf and Paul Gille, Villingen, Germany, assignors to Kienzle Apparate GmbH, Villingen, Black Forest, Germany Filed Apr. 7, 1967, Ser. No. 629,267
Claims priority, application Germany, Apr. 9, 1966, K 58,976
10 Claims. (Cl. 101—93)

ABSTRACT OF THE DISCLOSURE

The printing wheels of a multi-order printer have one "no- digit" position in addition to ten digit positions, and are set to one of the eleven positions under the control of an electronic computer whose input is connected with ten digit keys and one "no digit" keys. The printer prints groups of digits separated by spaces in selected positions of the same line, and an * or $ may be printed by each printing wheel in the "no digit" position to indicate the highest order of a number formed by the following group of printed digits.

BACKGROUND OF THE INVENTION

The invention relates to a printing system for accounting machines which have a manual input and are controlled by an electronic computer.

It is known to provide multi-order parallel printers in accounting machines, and the ordinal printing wheels according to the prior art are interconnected and cooperate with a stop means above the highest order in such a manner that in the orders above the highest order of a number, no zeroes are printed, whereas zeroes occurring in an order lower than the highest order of the printed number, are printed. When a ten-key keyboard is used, it is necessary to cooperate the zero key for printing zeroes after the highest order, whereas this is not necessary for full keyboards. The printing wheels on the right of the highest order of the printed number are taken to the printing position by a coupling with the printing wheel of the next higher order.

The German Patent 289,430 discloses a printing mechanism which permits "splitting" effected by an interruption of the sequential coupling between the printing elements of successive orders, but such splitting of the printing elements of the printer into independent groups is possible only in predetermined orders. For example, a printer having twelve printing wheels or other type carriers, can be split for independent operation between the sixth and the seventh order. If the printer is operated under the control of a program, the program can only determine whether in one or the other carriage position, a splitting of the printing mechanism in a predetermined order, for example the sixth order, is to take place.

Difficulties arise with this type of printers as regards the printing of zeroes in selected orders above the highest order in which a digit different from zero is printed. This is required for printing, for example account numbers which very often commence with one or several zeroes. Elaborate and expensive mechanical devices are necessary for printing zeroes above the highest order printing a digit different from zero with printers of this type. Such a construction is, for example disclosed in the German Patent 1,088,271. Printing systems of this type are not versatile and do not permit the printing of several narrow columns in the same line and by the same printing motion of the printer, although the capacity of the printer, which may have fourteen to eighteen ordinal printing elements, would be sufficient. This problem cannot be solved by the prior art providing for the splitting of the printing mechanism, since the splitting is only possible in given orders of the printer. For example, it is not possible to split the printing mechanism in accordance with one program after every third order, and in accordance with another program after every fifth order. In the first condition of a fourteen order printer, three numbers each having three orders and one number having five orders would be printed separated by spaces, while in the second condition two numbers having five orders and one number having four orders separated by spaces would be printed. The prior art cannot accomplish such printing operations.

SUMMARY OF THE INVENTION

It is one object of the invention to overcome this disadvantage of printers according to the prior art, and to provide a versatile multi-order printer capable of simultaneously printing separated groups of digits in the same line.

Another object of the invention is to provide a printer which is capable of printing zeroes before the highest digit of a number different from the digit zero.

Another object of the invention is to provide a printer which automatically prints symbols in the order above the highest order of a number.

With these objects in view, the present invention is particularly advantageously used for a computer controlled printing system for a business machine, such as an accounting machine.

One embodiment comprises a manual keyboard having at least ten digit keys and one "no digit" keys, computer means controlled by the keyboard, a multi-order printer having an ordinal series of printing means, each printing means having ten digit positions for printing the ten digits and an eleventh position for printing no digit, setting means controlled by the computer means for setting each of the printing means to one of the eleven positions thereof, and operating means for moving only printing means which are in the ten digit positions to a printing position for printing digits in the respective orders. No digit is printed in an order in which the respective printing means is in the eleventh position. In this manner, separate groups of digits representing independent numbers can be simultaneously printed in the same line.

The ordinal printing means are preferably type carrier wheels having ten digit types, and an eleventh type carrying a symbol such as an * or a $ which are simultaneously set by motor driven ordinal setting elements and arrested in the correct position by electromagnets under the control of an electronic computer. In accordance with the invention, the electronic computer receives, stores, and transmits distinguishable pulse combinations representing "no digit," and the digits from zero to nine. Either the type carrier wheels or the setting elements are arrested under the control of the computer in a "no digit" position, or in one of ten digit representing positions.

In accordance with an aspect of the invention, type carrier wheels which are in one of the ten digit positions, are moved toward the platen during the printing operation, while the type carrier wheels which are in the "no digit" position, are retained in an inoperative position so that no symbol is printed between the printed groups of digits, and free spaces are left.

In a preferred embodiment of the invention, it is possible to print under the control of the computer, certain symbols by means of type carrier wheels in the "no digit" position. Such symbols are used as a safety measure to indicate the highest order of a monetary value appearing on a check or the like. For example, a $, or an * is printed in the order above the highest order of a numerical value. Under a program command, such a symbol is printed by a type carrier wheel in the "no digit" position in the order above the highest order of the numerical value. Consequently, in accordance with the invention it is possible to provide a free space in any selected order, or to use a free space for printing a symbol.

In the preferred embodiment of the invention, coupling means controlled by the computer means are provided for coupling type carrier wheels in selected orders in the eleventh position with the printing means of the next lower order. When the printing means of the respective next lower order is moved by the operating means to the printing position for printing a digit, the printing means of the respective next higher order coupled therewith and being in the eleventh position, is also moved to the printing position and prints a symbol adjacent the next lower order, which is the highest order of the printed numerical value.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
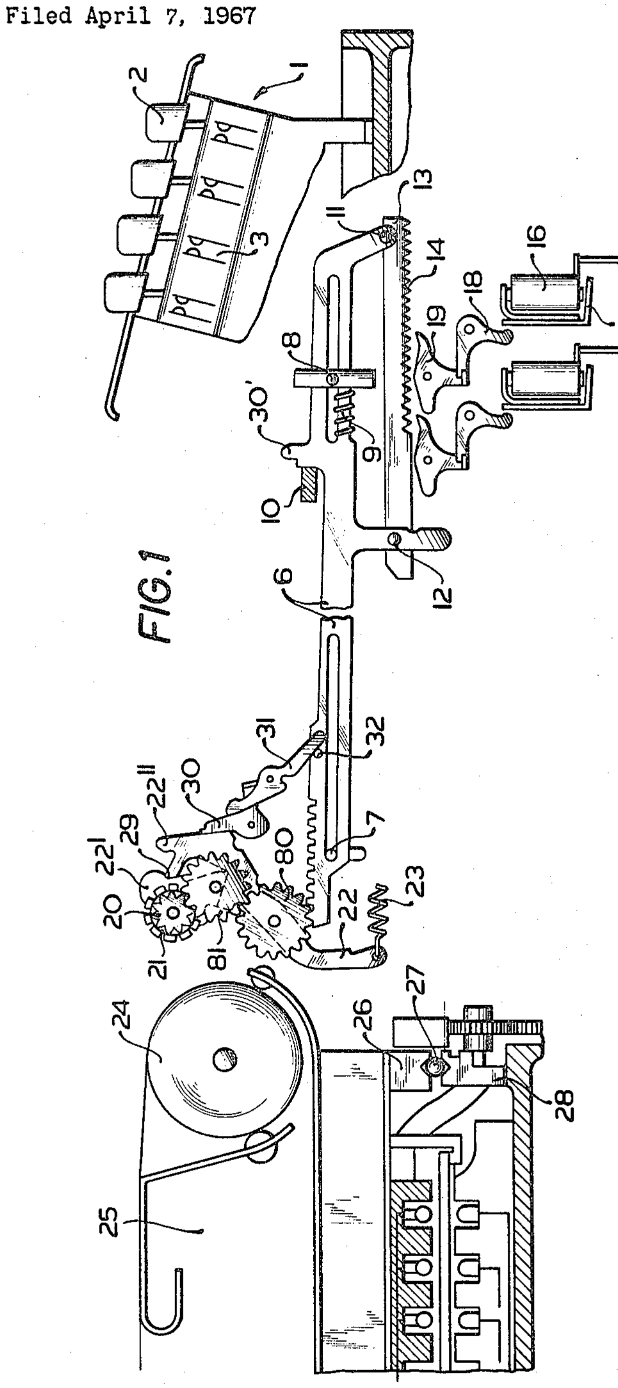
FIG. 1 is a fragmentary schematic elevation, partially in section, illustrating a printing system according to the invention as provided in an accounting machine, conventional elements which do not form part of the invention being omitted for the sake of clarity and simplicity.
Figure 3:
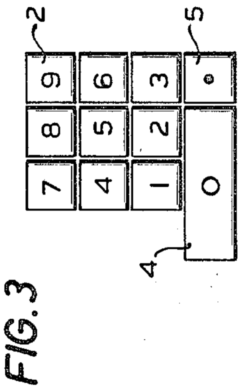
FIG. 3 is a fragmentary plan view illustrating a keyboard used in the printing system of the invention.
Figures 2, 6:
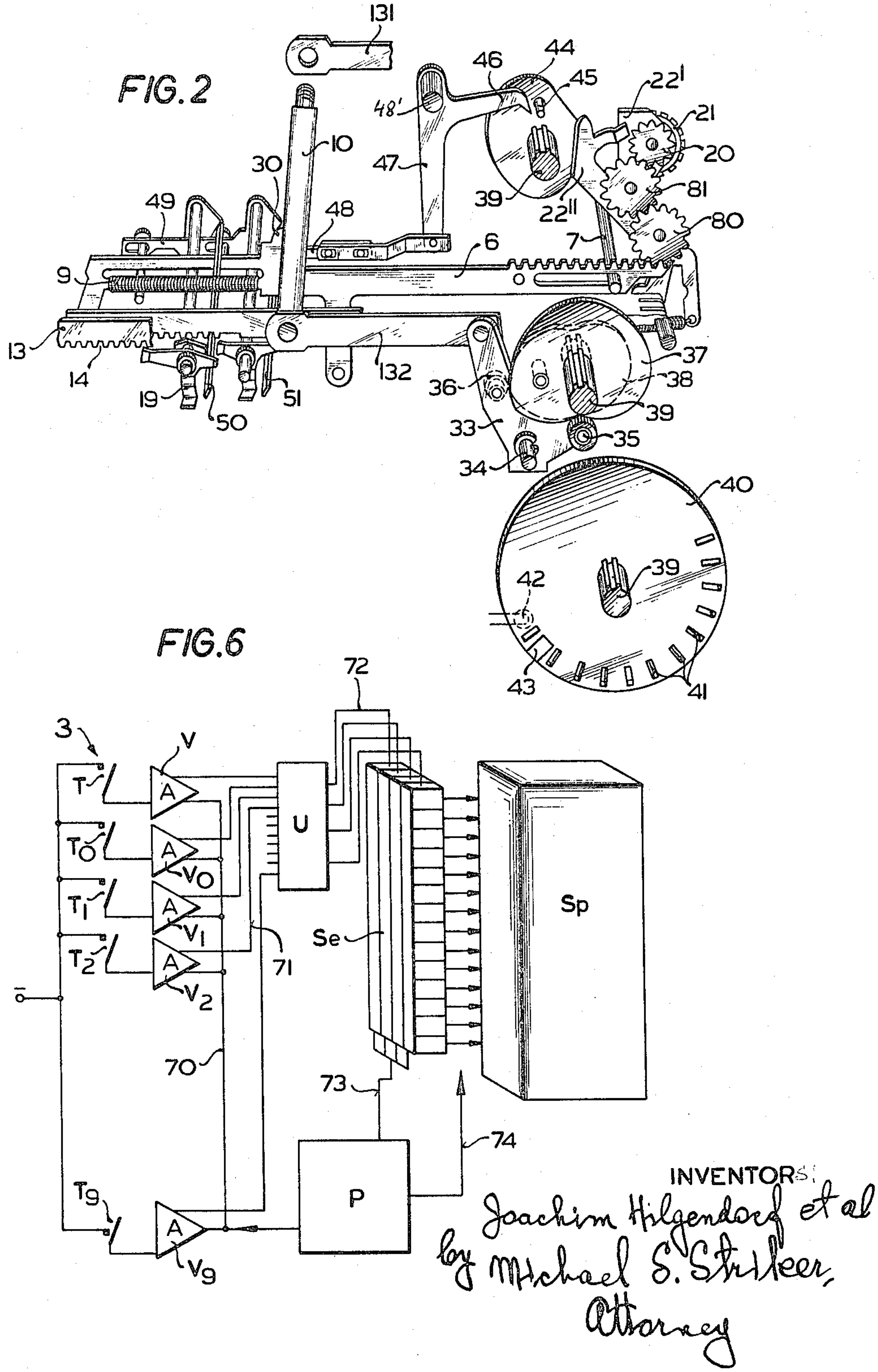
FIG. 2 is a fragmentary perspective view illustrating the mechanism for setting the type carrier wheels.
FIG. 6 is a schematic diagram illustrating an electric circuit whose input is formed by eleven key switches.

Referring first to FIGS. 1 and 3, a manual keyboard has ten digit keys including keys 2 associated with the digits from 1 to 9, and a larger key bar 4 associated with zero. In accordance with the invention, a "no digit" key, identified by a black dot, is also provided. Each key controls a key switch 3. The keyboard has function keys, not shown, which also control key switches 3. As shown in FIG. 6, key switches 3, which include switches $T_0$ to $T_9$, and a "no digit" switch T., form the input of an electronic computer means, as will be explained hereinafter in greater detail.

As shown in FIGS. 1 and 2, an ordinal series of setting bars 6 is provided. The setting bars have longitudinal slots and are guided for straight movement on transverse guide bars 7 and 8. A spring 9 abutting a fixed stop urges each setting bar to the left as viewed in FIG. 1, and to the right as viewed in FIG. 2. An abutment bar 10 is engaged by projections 30' on setting bars 6 and holds the same against the action of springs 9 in an initial position of rest. An arresting bar 13 is secured by bolts 11, 12 to projections of each setting bar 6 and has teeth 14 cooperating with arresting pawls 19. Springs, not shown, urge arresting pawls 19 into engagement with teeth 14, but arresting pawls 19 are held by trigger levers 18 which are controlled by tiltable armatures of electromagnetic means 16. When an electromagnetic means 16 is energized, trigger lever 18 is turned in clockwise direction and releases arresting pawl 19 so that the same engages a notch between two teeth of the respective arresting bar 13 and stops the respective setting bar during forward movement under the action of spring 9. As explained above, forward movement of setting bars 6 is started, when abutment bar 10 is moved away from projections 30' during an operational cycle of the machine. Each setting bar 6 can be stopped in one of eleven positions including ten digit positions and a "no digit" position.

Figures 4, 4A, 4B, 7:
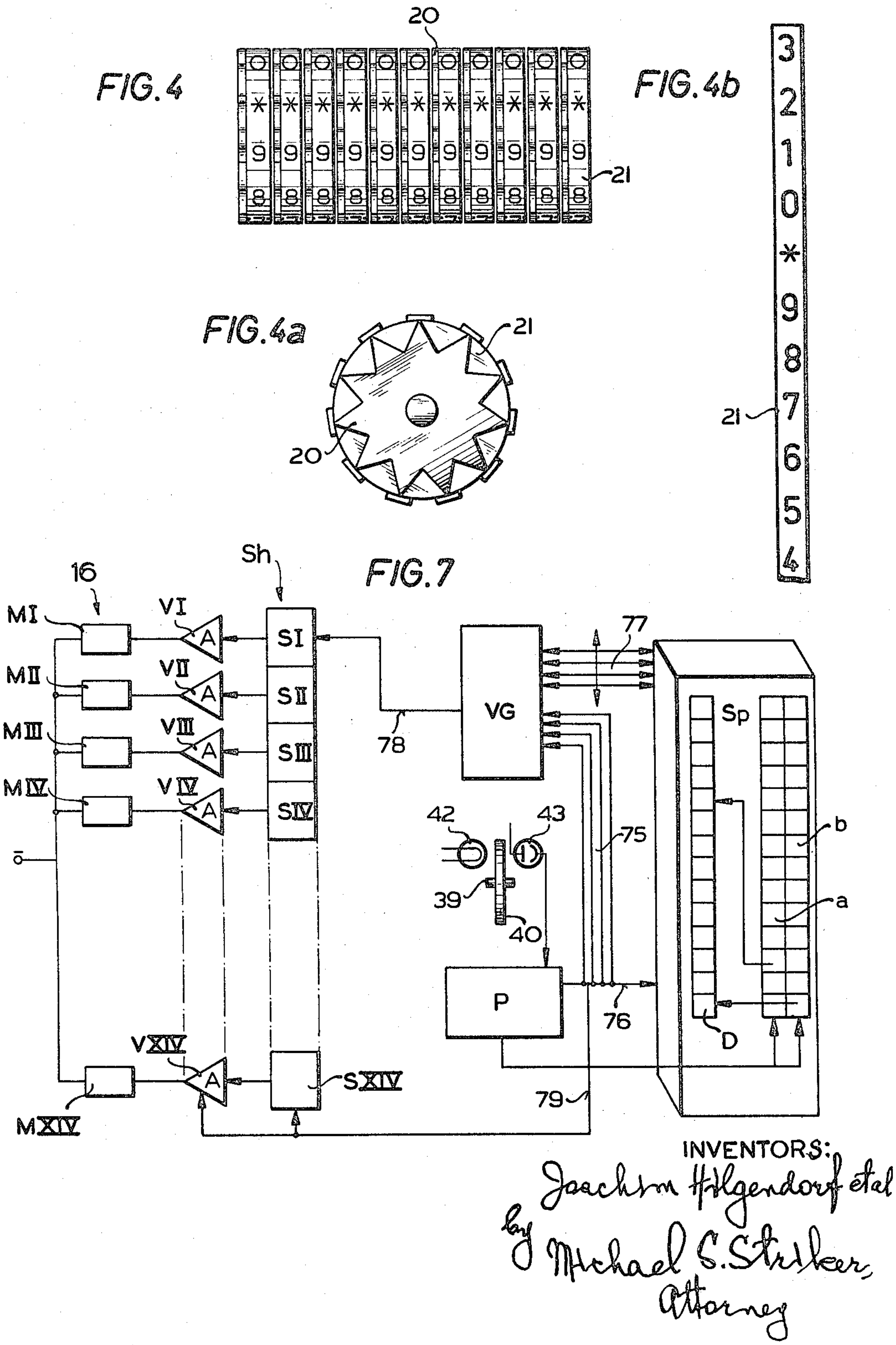
FIG. 4 is a schematic elevation illustrating the type carrier wheels of the printer.
FIG. 4*a* is a side elevation illustrating a type carrier wheel.
FIG. 4*b* is a developed view illustrating the type faces of a type carrier wheel.
FIG. 7 is a schematic diagram illustrating the output of the electric control circuit.

Setting bars 6 have rack portions meshing with gears 80 of gear trains including gears 80, 81 and 20, each gear 20 being secured to, and forming part of an ordinal type carrier wheel 21, as shown in FIGS. 4 and 4*a*. A printer having eleven ordinal printing means, or a greater number of type carrier wheels may be provided. Each type carrier wheel has ten type faces representing the digits from 0 to 9, and an eleventh type face representing a symbol shown to be an asterisk. Instead of the asterisk, a symbol representing a monetary unit may be used.

Gears 80, 81, 20 and type carrier wheels 21 are mounted on printing lever means 22 which include a first printing lever 22' and a second printing lever 22'' pivotally mounted on lever 22' movable a small angular distance. Lever 22' carries the gears and type carrier wheels 20, while lever 22'' has a nose 29 by which the type carrier wheels are aligned in the printing position since nose 29 engages a notch between two types of each type carrier wheel.

The type carrier wheels 20 are located opposite a platen 24 which is mounted on a paper carriage 25 which has fixed rails 26 rolling on balls 27 on stationary rails 28.

All printing levers 22' are mounted on a common shaft and are biased by springs 23 to turn in clockwise direction from the illustrated position of rest to a printing position in which an aligned row of type faces engages platen 24 to make imprints on a sheet thereon. However, the printing lever means 22 are locked in the illustrated inoperative position by locking members 30, 31 which are held in a locking position by stop pins 32 on the setting bar 6 of the respective orders.

As best seen in FIG. 2, abutment bar 10, which holds all setting bars 6 in an initial position of rest, is connected by a pair of links 131, 132 to a forked cam follower 33 mounted on a stationary shaft 34. The arms of cam follower 33 carry follower rolls 35 and 36 cooperating with a pair of rotary cams 37 and 38 which are carried by a main shaft 39 driven from a motor, not shown, a transmission, and a conventional one revolution clutch so that cams 37, 38 rotate 360° in clockwise direction as viewed in FIG. 2 during each operational cycle. Due to the shape of cams 37 and 38, cam follower 33 and links 132, 131 reciprocate abutment bar 10 first to the right as viewed in FIG. 2 and to the left as viewed in FIG. 1, so that projections 30 are released, and all setting bars 6 can start a rearward movement toward the platen 24 under the action of springs 9. During such movement, the rack portions of setting bars 6 are operative to turn the type carrier wheels 21 by the respective gear trains on printing levers 22. Whenever a turning type carrier wheel 21 in any order has reached the desired angular position, an impulse is given by a computer, in a manner which will be described hereinafter, and energizes electromagnetic means 16 in the respective order so that the respective arresting pawl 19 is released and stops movement of the setting bar 6 by engaging teeth 14 whereby the type carrier wheel 21 of the respective order is stopped.

The precise timing of the controlling impulses is obtained by a slotted disc 40 secured to main drive shaft 39 and having twelve radial slots arranged in a circular row along the periphery of disc 40, as shown in FIG. 2. The slotted portion of disc 40 moves between a source of light 42 in the form of a lamp and a photocell 43 so that passage of each slot 41 causes a timing impulse in photocell 43 which is used for interrogating an electronic storage device until the respective desired number of stored in the storage device is reached, whereupon the stop signal is given to the electromagnetic means 16. Each setting bar 6 is stopped by arresting means 13 to 19 at the moment in which a type on type carrier wheel 21 representing the digit or position stored in the storage device, is located opposite plate 24 ready to move with printing lever 22 to a printing position.

The type carrier wheels 21 successively assume the desired and stored positions while abutment bar 10 moves rearward and permits setting bars 6 to follow such movement. After shaft 39 has turned about 180°, the return stroke of abutment bar 10 is started, in which all setting bars 6, which were previously stopped by arresting means 16 to 19, are collected and returned to the initial position shown in FIG. 1.

Main shaft 39 carries also a cam 44 having a projecting stud 45 cooperating with a nose 46 on a cam follower lever 47 which is mounted on a stationary shaft 48', and is connected by a linkage 48 with slides 49 acting on clearing bars 50, 51 extending across setting bars 6 and arresting bars 13. Clearing bars 50, 51 cooperate with the arresting means to cause release of arresting bar 13 by arresting pawls 19, and latching of arresting pawls 19 by trigger levers 18 during the return movement of setting bar 6.

Figure 5A:
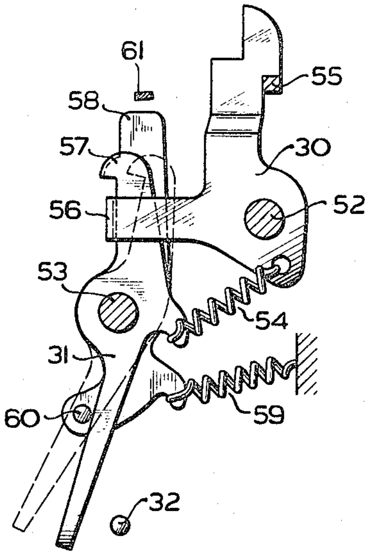
FIG. 5*a* is a side view illustrating parts of the mechanism of FIG. 5 in another operational position.
Figure 5B:
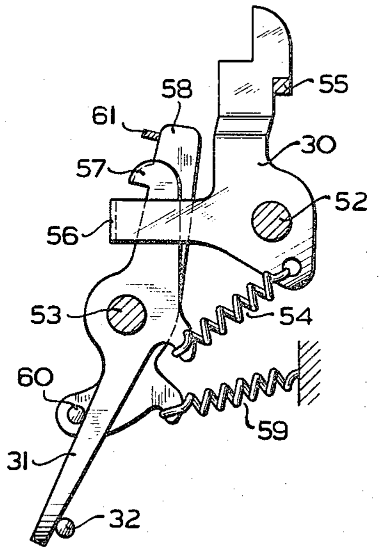
FIG. 5*b* is a side view illustrating parts of the mechanism of FIG. 5 in a third operational position.
Figure 5:
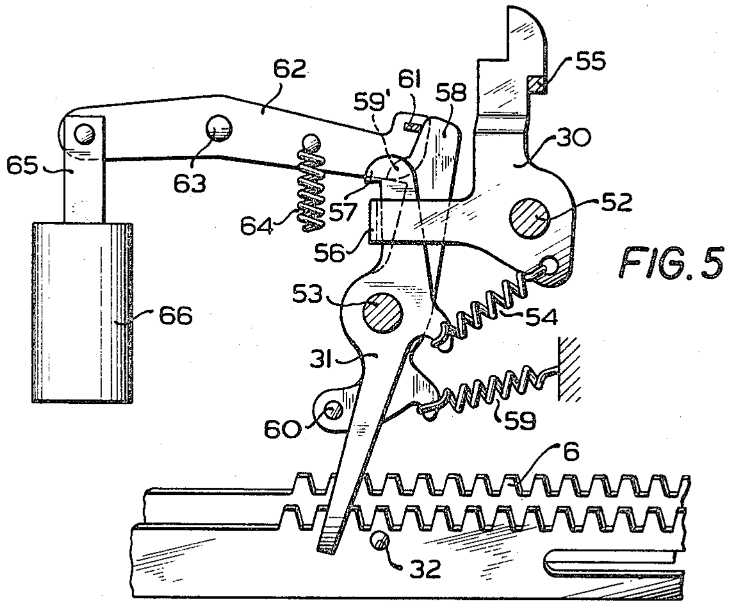
FIG. 5 is a fragmentary schematic side view illustrating mechanism for either preventing printing in orders in which the type carrier wheels are in the eleventh "no digit" position, or for permitting such type carrier wheels to print a symbol.

After the setting means have placed each of the type carrier wheels 21 in one of the eleven positions thereof, the operating means shown in FIGS. 5, *5a*, and *5b* effect movement of the printing means 22, 21 to the printing position.

FIG. 5 shows the end portions of setting bars 6 viewed from the opposite side as compared with FIG. 1, so that setting bars 6 move to the right in FIG. 5 when abutment bar 10 releases projections 30. FIG. *5b* in which the setting bars are omited for the sake of simplicity shows the mechanism in the same position as in FIG. 1. Ordinal stop levers 30 are mounted on a common shaft 52 and have stop projections 55 cooperating with the respective printing lever means 22 to hold the printing means 22, 21 of the respective order in the inoperative position spaced from plate 24 as shown in FIG. 1. A spring 54 urges each locking lever 30 to this locking position, and is connected with a projection on a releasing lever 31 of the same order. Springs 54 urge the releasing levers 31 to the position of FIG. *5b* abutting stop pin 32 of a setting bar which is in its normal initial position, which is a position between the position representing the digit 9, and the eleventh "no digit" position. It will be understood that the type carrier wheels 21 are in corresponding positions. When abutment bar 10 releases the setting bars 6, and the same move to the "no digit" position together with the type carrier wheels 21, the releasing levers 31 are turned in counterclockwise direction a small angle by the respective springs 54.

Each releasing lever has a coupling portion 57 which cooperates with a bent-over coupling portion 56 of the locking lever in the same order. Shaft 53 is moved during the operational cycle of the machine in downward direction as viewed in the drawing, and if the releasing levers 31 are in the inoperative position shown in FIG. *5b*, coupling portions 57 do not engage the corresponding coupling portions 56 of locking levers 30.

When the setting bars move from the position of rest to the "no digit" position, stop pins 32 move to the right as viewed in FIG. *5b* so that releasing levers 31 follow such movement under the action of springs 54 and coupling portion 57 moves toward coupling portion 56, but not far enough to engage the same during the downward movement of the releasing levers 31 with shaft 53.

If the setting bars continue the movement at least to the "zero" position, stop pins 32 move farther to the right as viewed in FIG. 5, and springs 54 turn releasing levers 31 until they abut the transversely projecting coupling portions 56, as shown in FIG. 5. In this position, an abutment of coupling portion 57 is located directly above an abutment of coupling portion 56, and when shaft 53 is moved downward, the respective locking levers 30 are coupled by coupling portions 56, 57 to releasing levers 31 which move downward together with shaft 53 so that locking levers 30 are turned in counterclockwise direction and release the respective printing means 22, 20 for movement by springs 23 to the printing position.

Due to this coupling arrangement, a setting bar 6, stopped by an arresting pawl 19 under the control of the computers in a position in which its correlated type carrier wheel 21 is in the "no digit" position, will not permit releasing lever 31 in the respective order to move to a position coupled with the respective locking lever 30.

Consequently, when during the following operational cycle shaft 53 is moved downward, the printing means of the respective order will not be released by the respective locking lever 30.

Any setting means moving to the zero position or beyond the same to another of the ten digital positions will not only set the type carrier wheel in the respective order to the respective digit, but also permit releasing lever 31 to move to the coupling position while stop pin 32 moves farther away from releasing lever 31.

From the above description of the ordinal operating means of the ordinal printing means, it will become apparent that the printing means 22, 20 of each order is independently operated to move to the printing position, and that the sequential interconnection between the printing means of different orders in accordance with the prior art is not used in the printing system of the present invention.

Shaft 53, releasing levers 31, coupling means 56, 57 and locking levers 30 constitute actuating means for causing movement of the printing means 22, 21 to the printing position when coupling means 56, 57 are in a coupling position which is only the case if the setting means 6 are in one of the ten digit positions. As explained above, if one or several of the setting means 6 are in a "no digit" position for setting the respective type carrier wheel 21 to the same position, coupling means 56, 57 is disengaged, the respective printing means 22, 21 remains locked, and the respective operating spring 23 cannot move the respective printing means to the printing position.

Figure 8:
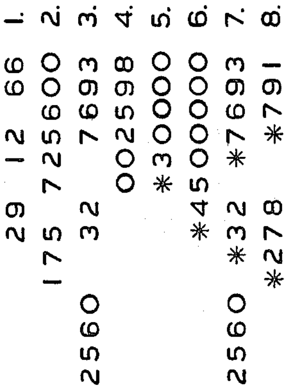
FIG. 8 illustrates numbers printed by the printer of the invention.

By an operation as described above, printed lines in the form shown in the first three lines of FIG. 8 can be obtained. For example, in the first line, stop signals from the computer have stopped the setting means 6, 13 of the third and sixth orders, and in the orders above the eighth order in the "no digit" position, and the type carrier wheels 21 were set correspondingly. Consequently, the coupling means 56, 57 were only engaged in the first, second, fourth, fifth, seventh, and eighth orders, and the printing means 22, 21 were released by the locking levers 30 for movement to the printing positions only in the last-mentioned orders in which digits were printed as shown in line 1 of FIG. 8. Three groups of two digits have been printed separated by spaces, and representing different numbers, so that in this manner a date, namely December 29, 1966 can be automatically printed. In line 3 of FIG. 8, it is shown that two spaces corresponding to two orders can be left free between groups of digits.

Line 4 of FIG. 8 shows a number having two zeroes in the highest orders, and no imprints above the sixth order. The two zeroes are printed by the respective ordinal printing means set to the zero position by the setting bars 6 under the control of the computer in which zeroes were stored in the respective orders. In the orders above the sixth, "no digit" positions were stored so that the ordinal printing means in the orders above the sixth order do not produce any imprints at all, as is desired for certain account numbers in which the highest orders have zeroes.

In accordance with the present invention, it is also possible to print an asterisk or a dollar sign in the order above the highest order to indicate the end of a number, as shown in lines 5 to 8 of FIG. 8. As explained above, and shown in FIGS. 4 and 4*b*, each type carrier wheel has such a symbol, for example an asterisk, in its "no digit" position, but this symbol is not printed in the above described operation, since the type carrier in the respective order is prevented from moving to the printing position.

However, if selected type carrier wheels in the "no digit" position are permitted to move to the printing position, the symbol appearing on the type face in the eleventh position will be printed. For example, in line 7 of FIG. 8, a type carrier wheel in the fifth order was permitted to move to the printing position although it was in the "no digit" position, while the type carrier wheel in the sixth order, which was also in the "no digit" position, was not permitted to move to the printing position, as explained above.

For producing imprints of printing means in the "no digit" position, coupling levers 58 are mounted for turning movement on shaft 53. Coupling levers 58 may be provided only in selected orders in which printing of a symbol is desired, or in all orders, if desired. Each coupling lever 58 is biased by spring 59 to turn in counterclockwise direction. Each coupling lever 58 has a coupling portion 59' having the same shape as coupling portion 57 of releasing lever 31. Consequently, the two coupling portions 57 and 59' are superimposed in FIGS. 5*a* and 5*b*. Each coupling lever has a coupling pin 60 cooperating with the release lever 31 of the next lower order due to the action of spring 59. In the initial position of rest shown in FIG. 5*b*, in which releasing levers 31 abut stop pins 32 on setting bar 6, coupling pins 60 abut releasing levers 31, and coupling portions 57, 59' are superimposed and located in the inoperative position which, as described above for coupling portion 57, does not permit engagement between coupling portions 57, 59' on one hand, and coupling portion 56 of locking levers 30 on the other hand during the downward movement of shaft 53 with releasing levers 31 and coupling levers 58.

Coupling levers 58 have upper arms which are longer than the upper arms of releasing levers 31 and project above the same. A control bar 61 extends across all coupling levers 58 and holds the same in a normal inoperative position shown in FIGS. 5 and 5*b*. Control bar 61 is mounted on a pair of levers 62 which are supported on pivot 63 and have arms connected with the armatures of electromagnetic means 66. When electromagnetic means 66 is energized by an impulse from the storage means of the computer, as will be explained hereinafter, lever 62 are turned in counterclockwise direction as viewed in FIG. 5, and control bar 61 is moved out of the blocking position shown in FIGS. 5 and 5*b* to a releasing position shown schematically in FIG. 5*a*. When coupling levers 58 are released by control bar 61, they are still held by springs 59 in the position of FIG. 5*b* abutting with couplin pin 60 on the releasing lever 31 of the next lower order which is held by its spring 54 in an inoperative position abutting stop pin 32 of the respective setting bar 6.

For example, a coupling lever 58 provided in the third order, is held in the position of FIG. 5*b* by the releasing lever 31 of the second order, if no digit was entered in the respective order and the respective setting bar in this order remains in its position of rest.

Assuming, however, that the digit 2 was entered in the second order so that the setting bar 6 moves toward the right as viewed in FIG. 5, and releasing lever 31 of the second order follows this movement until abutting coupling portion 56 in the position of FIG. 5 and FIG. 5*a*, coupling lever 58 of the third order will be urged by spring 59 to follow the movement of releasing lever 31 in counterclockwise direction, but is prevented from such movement by control bar 61 in the blocking position shown in FIG. 5. When control bar 61 is moved by a signal from the computer energizing electromagnetic means 66 to the releasing position shown in FIG. 5*a*, spring 59 turns coupling lever 58 of the third order in counterclockwise direction until its coupling pin 60 abuts against the releasing lever 31 so that coupling portion 57 of releasing lever 31 of the second order is located directly above coupling portion 56 of locking lever 30 of the same second order, while coupling portions 59' of coupling lever 58 of the third order is located directly above coupling portion 56 of locking lever 30 of the third order.

When actuating shaft 53 starts downward movement, releasing lever 31 of the second order releases locking lever 30 of the same order so that a digit is printed in the second order, and coupling lever 58 of the third order releases locking lever 30 of the third order so that the printing means 22, 21 of the third order, which is in the "no digit" position, is moved by operating spring 23 to the printing position and prints a symbol, for example as asterisk, in the third order. Releasing lever 31 of the third order remains in the inoperative position shown in broken lines in FIG. 5*a*.

For printing the numbers appearing in the first four lines of FIG. 8, no signal was given by the computer to electromagnetic means 66 so that all coupling levers 58 remain blocked in the position of FIG. 5 and could not actuate the respective printing means.

However, when printing the numbers in lines 5 and 6, for example, of FIG. 8, control bar 61 was moved to the releasing position shown in FIG. 5*a* so that coupling lever 58 of the order above the highest order in which a digit between zero and 9 was entered, could follow the movement of the releasing lever 31 of the respective highest order of the number so that the printing means of the order above the highest order of the number, the sixth order in line 5 of FIG. 8, was released to move to the printing position, and since this printing means was in the "no digit" position, an asterisk was printed in the sixth order.

The coupling levers 58 of the orders above the seventh order could not produce imprints of asterisks, since releasing lever 31 of the sixth order remains in the position shown in broken lines in FIG. 5*a*, so that the coupling lever 58 of the next higher order could not move to the coupling position, so that the printing means of this next higher order, which also was in the "no digit" position, was not removed to the printing position, and consequently could not print the symbol.

The control of the computer by the manual keyboard, and the control of the setting and printing means by the computer, will now be explained with reference to FIGS. 6 and 7.

The ten digit keys, and the key 5 representing the "no digit" position, control eleven key switch 3 designated $T_0$ to $T_9$ and T. in FIG. 6. Each key switch is connected with a corresponding amplifier element $V_0$ and $V_9$, and V. so that the signals produced by the key switches are amplified. The microprogram P transmits through lines 70 interrogation impulses to the individual amplifier elements. If one of the key switches is closed, so that the respective amplifier element is conductive, the appearance of an interrogation impulse provided by microprogram P produces in the respective amplifier element an impulse which is transmitted from the output of the amplifier element to a code converted or translator U.

Code converter U has eleven inputs corresponding to the eleven amplifier elements and key switches, and converts the decimal code "one out of eleven" into a four bit code, for example, the binary code, so that depending on the input impulse, combinations of four simultaneous pulses appear on the four outputs of the code converter U. Evidently, eleven combinations are possible respectively corresponding to the digits from zero to nine, and to the pulse produced by actuation of the "no digit" key 5.

The four outputs of the code converter are each connected to a shift register S*e* which has, for example, fourteen stages.

Before the keys are operated to enter values into the computer, all stages of the shift register S*e* are filled through a line 73 by the microprogram P with the pulse combination representing "no digit" so that before the actual entry of input values takes place, the four shift registers are filled in all fourteen stages with the pulse combination representing the position "no digit."

As values are entered into the input by operation of the keys and key contacts, corresponding pulse combinations are entered into the four shift registers S*e* so that at the end of the manual input operation, the entered digit, or the "no digit" position are stored in the stages of the shift register in the form of the storage of a bit, or no storage of a bit.

All stages of each of the four shift registers, which correspond to orders, and which were not set to a code combination representing a digit between zero and nine, still registers the code combination representing the "no digit" position, while the other stages are set to code combinations corresponding to the respective actuated key. It may happen, that between actuations of keys representing the digits zero to nine, also the "no digit" key is depressed one or several times, so that in the respective stages or orders of the shift registers, the code combination "no digit" is registered. As soon as the input operation is terminated, a command signal is given by microprogram P through line 74, causing simultaneous transfer of the information contained in the stages of the four shift registers into the storage means SP, so that the computer is ready for the input of a new value.

If the entered numerical value is not only to be used in a computing operation, but is also to be printed out, as required in most cases, a motor key, not shown, provided on the keyboard is actuated and causes, indirectly through the electronic computer, the performance of an operational cycle of the machine during which main shaft 39 is turned a single revolution, as explained with reference to FIG. 2.

When the first timing impulse is produced in photocell 43 by the passage of light from lamp 42 through the first slot 41 in the rotary disc 40, see FIGS. 2 and 7, the microprogram P is triggered which transmits the first pulse combination representing "no digit" into a comparison device VG through four code lines 75. At the same time, the microprogram P transmits an interrogation pulse to the corresponding storage unit of the storage device SP so that the individual storage units, each of which consist of four storage elements, corresponding to the code combination, are successfully interrogated.

The pulse combination representing the individual digits of a stored value are transferred through the four lines 77 into the comparator VG and compared with the pulse combination transmitted from the microprogram through line 75. The contents of the fourteen orders of the storage unit D are successfully entered into the comparator VG, and compared with a first registered information, namely "no digit" which was supplied to comparator VG through lines 75. If in any order of the storage device, the "no digit" position is stored, comparator VG produces an output signal which passes through output signal which passes through output line 78 into the first stage of a shift register S*h* which consists of fourteen stages $S_I$ to $S_{XIV}$. If the comparison is negative, the information in shift register S*h* is shifted and the transmitted pulse combination is returned through lines 77 into the storage unit. This comparison is terminated long before the next timing impulse is produced by the photoelectric timing device 40 to 43.

When the second pulse is produced in photocell 43, a signal is transmitted through line 79 to the stages of shift register S*h*, and to the amplifiers V. to $V_{XIV}$. In those stages of shift register S*h* in which a "1" was stored, and in which consequently the comparison in comparator VG was positive, a signal is transmitted to the corresponding amplifier $V_I$ to $V_{XIV}$ so that the respective electromagnetic means M to $M_{XIV}$, which correspond to the electromagnetic means 16 described with reference to FIG. 1, are energized and actuate arresting pawls 19 to stop and arrest the respective setting means 6, 13 in the correct position so that the respective type carrier wheels 21 assume a corresponding position.

The second timing pulse produced by photocell 43 simultaneously causes another interrogation of the storage unit and a transfer of the pulse combination for the second position of the type carrier wheel, namely the "zero" position through line 75 into comparator VG. All fourteen stages of storage unit D are compared with the value transmitted through lines 75, and the binary L or zero signals are stored in shift register S*h* so that after the completion of the fourteen comparisons, those electromagnetic means $M_I$ to $M_{XIV}$ are energized which have to arrest the respective setting means and type carrier wheels in the second "zero" position. The interrogation is effected sequentially for all fourteen storage stages and also for all eleven positions of the setting bar 6, and setting bars 6 are always stopped by electromagnetic means 16 ($M_I$ to $M_{XIV}$) at the proper moment. Only where the setting bars 6 have moved to the last position representing the digit "9," printing means 22, 21 are released by actuating shaft 53 moving downward under the control of a cam, not shown, on main shaft 39 so that the entire number is printed on a sheet on platen 24. Referring again to FIG. 8, the various possibilities afforded by the present invention in printing numerical values are shown. Line 1 shows a date in which the numbers representing days, months and years are separated by spaces obtained by depressing the "no digit" key 5 instead of operating a digit key in the respective orders. Line 3 shows three groups of digits forming independent numbers spaced from each other by double spaces so as to fill all fourteen available orders of a printer having fourteen type carrier wheels. As mentioned above, line 4 shows that zeroes can be entered by key operation in the highest order of a number which is not possible for printing devices according to the prior art in which the printing of zeroes in the orders above the highest order of the number is automatically suppressed. Lines 5 to 8 show the automatic printing of an asterisk or other symbol in the order above the highest order of a number for the purpose of preventing the fraudulent insertion of a digit or digits in orders higher than the highest order of the printed number.

Due to the fact that the printing means of each order is independently actuated to move to the printing position the splitting of the printed number into several groups of digits or numbers is possible. The splitting can be accomplished not only be operation of the "no digit" key 5 when the respective order is entered, but may also be automatically obtained by a program signal. It may be desired to print a monetary value, for example the price of an article, in the lowest seven orders of the printer, and to print in the five highest orders of a fourteen order printer, a five-order number representing the article.

The storage device described with reference to FIG. 7 does not only contain the fourteen stage printing storage device D, but also a number of additional storing devices, for example the storing devices *a* and *b*, each of which has fourteen stages or orders. Under the control of microprogram P, the article number can be stored in storage device *a*, and the price of the article stored in storage device *b*. Before the printing takes place, the contents of storage device *a* is transferred into stages 10 to 14 of storage device D, and the contents of storage device *b* is transferred into the first four stages or orders of the storage device D so that the printing of the number can be controlled by storage device D in such a manner that the two numbers are printed in the same line separated from each other by empty spaces since the printing means in the eighth and ninth orders are prevented from printing in the "no digit" position which information was initially entered by microprogram P in all stages of the shift register S*e*.

It will be understood that each of the elements described above, or two or more together, may also find a useful application in other types of printing systems differing from the types described above.

While the invention has been illustrated and described as embodied in printing wheels having an eleventh position in which no digit is printed, it is not intended to be limited to the details shown, since various modifications and structural changes may be made without departing in any way from the spirit of the present invention.

Without further analysis, the foregoing will so fully reveal the gist of the present invention that others can by applying current knowledge readily adapted it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Computer controlled printing system for a business machine, comprising, in combination, a manual keyboard having at least ten digit keys and one "no digit" key; computer means controlled by said keys; a printer having an ordinal series of printing means, each printing means having ten digit positions for printing the ten digits and an eleventh "no digit" position for printing no digit; an ordinal series of setting means controlled by said computer means for setting each of said printing means to one of said eleven positions thereof; and operating means for moving only printing means which are in one of said ten digit positions to a printing position for printing digits in the respective orders, while no digit is printed in an order in which the respective printing means is in said eleventh position thereof whereby separate groups of digits representing independent numbers are simultaneously printed in the same line separated from each other where a printing means is in said eleventh position.

2. A printing system as claimed in claim 1 wherein said operating means include actuating means, and an ordinal series of coupling means having coupling positions connecting only printing means in one of said ten digit positions with said actuating means, said coupling means being controlled by said setting means, respectively, to move to said coupling position when the respective setting means moves to a position for setting the respective printing means to one of said ten digit positions, and to be in a disengaged position when the respective setting means moves to a position for setting the respective printing means to said eleventh position whereby operation of said actuating means effects through said coupling means movement of printing means in said ten digit positions to the printing position.

3. A printing system as claimed in claim 2 wherein each printing means includes a type carrier movable between said eleven positions; wherein said operating means include springs urging said type carriers to said printing position; wherein said actuating means include an ordinal series of locking means for locking said printing means in a position of rest, and an ordinal series of releasing means for releasing said locking means; wherein said coupling means are connected with said releasing and locking means and couple in said coupling position said releasing means with said locking means of the same orders, said releasing means and said coupling means being controlled by said setting means; and wherein said actuating means operate said releasing means and through said coupling means also said locking means to release the respective printing means for movement to the printing position.

4. A printing system as claimed in claim 3 wherein said releasing means are releasing levers and said locking means are locking levers; wherein said coupling means are cooperating coupling portions of said releasing and locking levers; and wherein said actuating means include a shaft supporting said releasing levers and being movable with the same and with the respective coupling portions of the same; and wherein said setting means whose correlated printing means are in said "no digit" position place the respective releasing levers in a position in which said coupling portions do not engage each other during movement of said actuating means so that the respective releasing levers do not release the respective locking levers whereby the printing means in the respective orders do not move to the printing position.

5. A printing system as claimed in claim 1 wherein said setting means have a normal position of rest; and comprising means for moving said setting means from said position of rest first to a "no digit" position in which said printing means are set to said eleventh "no digit" position, and then to ten successive digit positions in which said printing means are set to said ten digit positions.

6. A printing system as claimed in claim 1 wherein said printing means include type carriers having ten digit types and one symbol type; wherein each printing means in said eleventh position has said symbol type disposed operable for producing an imprint; and comprising coupling means controlled by said computer means for coupling printing means in selected orders in said eleventh position with the printing means of the next lower order, respectively, so that when said printing means of the respective next lower order is moved by said operating means to said printing position for printing a digit, the printing means of the respective next higher order coupled therewith and being in said eleventh position is also moved to said printing position for printing a symbol adjacent the highest order of a group of digits representing a numerical value.

7. A printing system as claimed in claim 1 wherein said printing means include type carrier means having ten digit types and a symbol type and being disposed in said eleventh position when said symbol type is positioned for making an imprint; wherein said setting means are movable between ten digit positions and an eleventh "no digit" position for moving said type carrier means between said eleven positions; comprising an ordinal series of locking means for locking said printing means in inoperative positions; an actuating shaft; an ordinal series of releasing means mounted for angular movement on said shaft and being movable with the same to a releasing position, said releasing means having a coupling position coupled with the corresponding locking means for releasing the same in said releasing position and being controlled by said setting means to assume said coupling position only when said setting means is in one of ten digit positions, and to remain in an inoperative position when said setting means is in the eleventh position in which said printing means is set to print the symbol type; springs for moving printing means released by said locking means to printing positions; a series of coupling means mounted on said actuating shaft for angular movement and for movement with the same to an actuating position, each coupling means being biased to move to a position coupled with the locking means of the respective order, and being held in a disengaged position by the releasing means of the next lower order, each coupling means moving to said coupling position when the releasing means of said next lower order moves to its coupling position under the control of said setting means of said next lower order moving to one of said ten digit positions so that said coupling means in said actuating position releases said locking means whereby the respective printing means is released for movement to a printing position for printing said symbol type.

8. A printing system as claimed in claim 7 and comprising control means controlled by said computer for selectively blocking movement of said coupling means in an inoperative position of rest so the said coupling means do not release said locking means of said printing means in orders in which said type carriers of said printing means are in said eleventh positions so that no symbols are printed.

9. A printing system as claimed in claim 8 wherein said coupling means include coupling levers and said releasing means include releasing levers mounted on said actuating shaft, said coupling levers and releasing levers having coupling portions of the same shape cooperating with portions of said locking means.

10. A printing system as claimed in claim 8 wherein said control means include a control bar for blocking movement of said coupling levers to said coupled position, and electromagnetic means energized by signals from said computer means to move said control bar to a position releasing said coupling levers for movement to said coupled position; and comprising springs urging each coupling lever into said coupling position.

References Cited

UNITED STATES PATENTS

| | | | |
|---|---|---|---|
| 2,007,180 | 4/1937 | Muller | 235—60.23 |
| 2,641,180 | 6/1953 | Hamilton | 101—93 |

WILLIAM B. PENN, *Primary Examiner.*